April 20, 1954 R. B. TROUSDALE 2,676,250

PULSE CLIPPING CIRCUIT

Filed April 27, 1950

INVENTOR.
Robert B. Trousdale
BY T. L. Bowes
Att'y

Patented Apr. 20, 1954

2,676,250

UNITED STATES PATENT OFFICE 2,676,250

PULSE CLIPPING CIRCUIT

Robert B. Trousdale, Rochester, N. Y., assignor to Stromberg-Carlson Company, a corporation of New York Application April 27, 1950, Serial No. 158,539

15 Claims. (Cl. 250—27)

This invention relates to a pulse clipping circuit, and, more particularly, to a pulse clipping circuit suitable for removing noise and other undesirable impulses from a predetermined portion of a pulse wave train. Specifically, the instant application is a continuation-in-part of the copending joint application of Frank A. Morris and Robert B. Trousdale, Serial No. 134,974, filed on December 24, 1949, and assigned to the same assignee as the present application.

In many electronic pulse transmission systems it is desirable to provide a pulse clipping circuit wherein certain portions of the pulses may be clipped to remove noise bursts and other objectionable impulse disturbances. This is particularly true in situations wherein the pulses are to be used to control, or trigger, electrical circuits at a particular instant of time which must be very accurately synchronized with the occurrence of other related circuit functions. For example, as disclosed in the application referred to above, the present invention is specifically applicable to an electronic telephone system wherein it is necessary to remove from the base lines of the signal and intelligence bearing pulses of the system any noise impulses and other undesirable disturbances which may interfere with the proper control functions of the pulses. In order to utilize such pulses without interference from the noise disturbances superimposed thereon, it is necessary to remove, or clip, the portion of the wave form containing the undesired disturbances. Another instance where the present invention finds specific application is in the reception of television signals wherein it is necessary to separate, or clip, the superimposed synchronizing pulse from the remainder of the received video wave. In order properly to synchronize the scanning equipment of the television receiver, it is necessary that the clipped synchronizing pulses do not contain noise and other undesirable disturbances. It is also necessary in television receivers to provide a clipped synchronizing pulse wave form of substantially constant amplitude although the amplitude of the input signal may vary over relatively wide limits due to changes in the signal strength of the received signal.

Accordingly, it is an object of the present invention to provide a new and improved pulse clipping circuit wherein a predetermined portion of an input pulse wave train may be selected.

It is a further object of the present invention to provide a new and improved pulse clipping circuit wherein noise impulses and base line hash may be substantially removed from an input pulse wave train while maintaining a relatively noise-free output pulse wave train of substantially constant amplitude.

It is a still further object of the present invention to provide a new and improved pulse clipping circuit wherein a predetermined portion of a pulse wave train may be selected, the selected portion being a fixed percentage of the total amplitude of the wave train.

It is another object of the present invention to provide a new and improved pulse clipping circuit wherein a predetermined fixed portion of an input pulse wave train may be selected despite wide variations in the amplitude of the wave train.

It is still another object of the present invention to provide a new and improved pulse clipping circuit suitable for selectively providing from an input pulse wave train a relatively noise-free output pulse wave train comprising either a fixed percentage of the amplitude of the input wave train or an output wave train of fixed amplitude regardless of the amplitude of the input wave train.

The invention, both as to its organization and method of operation, together with further objects and advantages thereof, will best be understood by reference to the following specification taken in connection with the accompanying drawings in which.

Figure 1:
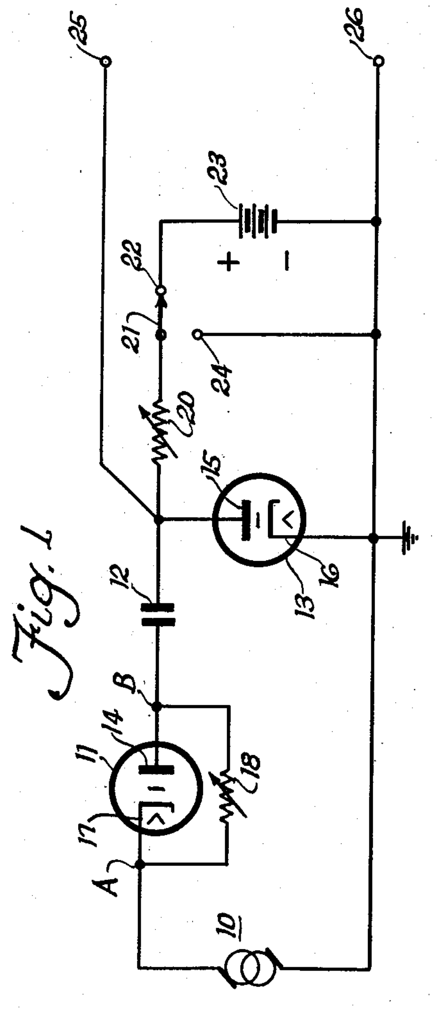
Fig. 1 is a schematic diagram of a pulse clipping circuit embodying the principles of the present invention.

Referring now more particularly to the drawing, there is illustrated in Fig. 1 the pulse clipping circuit of the present invention in which a source of pulses, indicated generally at 10, is utilized to supply an input signal to the series combination of a first electron discharge device 11, a capacitor 12, and a second electron discharge device 13. The devices 11 and 13 are of the diode rectifier type, the anode 14 of device 11 being connected to the capacitor 12 and the anode 15 of the device 13 also being connected to the capacitor 12. The cathode 16 of the device 13 is connected to ground. The cathode 17 of device 11 is connected to the ungrounded terminal of the pulse source 10. A variable resistor 18 is connected between the anode and cathode of the device 11. The anode of the device 13 is connected through a variable resistor 20 to the arm of a selector switch 21. A first contact 22 of the switch 21 is connected to the positive terminal of a unidirectional source of potential indicated as the battery 23. A second contact 24 of the selector switch is connected to ground. Thus, one side of the resistor 20 may be selectively connected either to the battery 23 or to ground. The output signal, which has been clipped by means of the present pulse clipipng circuit so as to remove the noise components and base line hash therefrom appears across the rectifier 13 and is impressed across the terminals 25 and 26.

Figure 2:
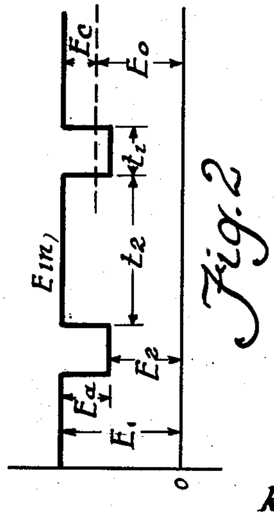
Fig. 2 is a timing diagram illustrating the pulse wave form applied to the circuit of Fig. 1.

In considering the operation of the above-described circuit, the input pulse wave train supplied by the source 10 is graphically illustrated in Fig. 2 as comprising a wave train having a maximum positive voltage with respect to ground of $E_1$, the voltage $E_1$ being reduced to the value $E_2$ for the time interval $t_1$ of each negative going pulse. Successive pulses are separated by the time interval $t_2$. In considering the operation of the circuit of Fig. 1 with the resistor 20 connected to the battery 23, it is evident that with no signal applied, the output voltage appearing between the terminals 25 and 26 is zero if the rectifier 13 is also assumed to be a perfect device such that it passes current from the source 23 through the resistor 20 to ground and has no appreciable voltage drop thereacross. When the pulse wave train $E_{in}$ of Fig. 2 is applied to the circuit of Fig. 1 and $E_{in}$ has the value $E_1$, current flows from the circuit point A of Fig. 1 through the resistor 18 to the circuit point B of Fig. 1 and thence through the capacitor 12 and the rectifier 13 to ground. Moreover, if sufficient time elapses with this condition undisturbed, the capacitor will charge to the voltage level of $E_1$, at which time current flow through the capacitor is arrested. We may designate the voltage across the capacitor 12 as the potential $E_0$. In this connection, it will be understood that the rectifying device 13 may comprise the control electrode-cathode portion of a multi-electrode electron discharge device as will be readily apparent to those skilled in the art.

Assuming now that after the capacitor voltage $E_0$ becomes equal to the value $E_1$, the voltage $E_{in}$ drops to the value $E_2$ at the start of a pulse, as shown in Fig. 2. When this occurs, the voltage $E_0$ exceeds the voltage $E_{in}$ so that the rectifier 13, which has appreciable resistance in the forward direction, is rendered conductive to bring the circuit point B down to the voltage level $E_2$. Due to the fact that the potential across the capacitor 12 cannot change instantaneously, the drop in potential at one side of the capacitor, due to the conduction of device 11, causes a corresponding drop at the other side of the capacitor and the anode of device 13 is driven below ground.

So long as the pulse persists, the input voltage $E_{in}$ remains at the value $E_2$. During this interval, the capacitor 12, one side of which is now below ground potential, discharges through the resistor 20 towards ground potential. If the pulse interval $t_1$ were sufficiently long, the capacitor 12 would discharge to ground potential whereupon the voltage $E_0$ across the capacitor would just equal the voltage $E_2$ and the rectifier 13 would again start to conduct current from the source 21 and hold the voltage $E_0$ at a fixed value. Should this occur, the voltage appearing at the output terminal 22 would again be reduced to zero. If the voltage $E_{in}$ should now change from the value $E_2$ back to the value $E_1$, the capacitor 12 would recharge through the resistor 18 and the rectifier 13 back to the voltage level $E_1$.

Assuming now that the input voltage $E_1$ changes on a repetitive basis and in the manner shown in Fig. 2 from the value $E_1$ to the value $E_2$ and back to the value $E_1$ so rapidly that the charge on the capacitor 12 and hence the voltage $E_0$ thereacross does not have time to change appreciably. Under this assumption the circuit of Fig. 1 may now be investigated to determine whether the voltage $E_0$ across the capacitor 12 can be made to assume an equilibrium value somewhere between the values $E_1$ and $E_2$.

Figure 4:
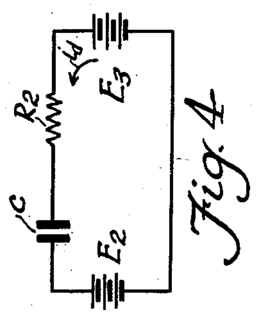
Figs. 3 and 4 are schematic diagrams utilized to explain the operation of the circuit of Fig. 1.
Figure 3:
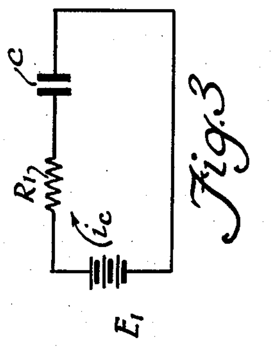

In order to analyze mathematically the performance of the circuit of Fig. 1 when supplied with the wavetrain of Fig. 2, the equivalent circuits shown in Figs. 3 and 4 may be utilized. The equivalent circuits of Figs. 3 and 4 illustrate the conditions existing in the circuit of Fig. 1 when the input voltage $E_{in}$ has the values $E_1$ and $E_2$, respectively. Referring to Figs. 3 and 4, the capacitor 12 is illustrated as the equivalent capacitor C, the resistor 18 (shown in Fig. 1) is illustrated as the equivalent resistor $R_1$, and the resistor 20 is illustrated as the equivalent resistor $R_2$. If $E_1$, $E_2$, $E_3$, and the capacitor voltage $E_0$ do not change appreciably during the intervals $t_1$ and $t_2$, then $$(1)\qquad i_c=\frac{E_1-E_0}{R_1}$$

and $$(2)\qquad i_d=\frac{E_3+E_0-E_2}{R_2}$$

and the charges entering and leaving the condenser C during these intervals are as follows:

$$(3)\qquad Q_c=\left\{\frac{E_1-E_0}{R_1}\right\}t_2=\text{charge entering condenser C during each interval } t_2$$

and $$(4)\qquad Q_d=\left\{\frac{E_3+E_0-E_2}{R_2}\right\}t_1=\text{charge leaving condenser C during each interval } t_1$$

Obviously, the voltage $E_0$ across the condenser C can remain constant over a period of time only if the charge going into the condenser equals the charge coming out of the condenser. Thus, to have a constant equilibrium value of $E_0$, the charge $Q_c$ must equal $Q_d$. From Equations 3 and 4, therefore, $$(5)\qquad \left\{\frac{E_1-E_0}{R_1}\right\}t_2=\left\{\frac{E_3+E_0-E_2}{R_1}\right\}t_1$$

as shown in Fig. 2, let $$(6)\qquad E_a=E_1-E_2$$

and $$(7)\qquad E_c=E_1-E_0$$

$$(8)\qquad E_1=E_a+E_2$$

$$(9)\qquad E_1=E_c+E_0$$

$$(10)\qquad E_a+E_2=E_c+E_0$$

and $$(11)\qquad E_0-E_2=E_a-E_c$$

Substituting these values to eliminate $E_0$, $E_1$ and $E_2$ from Equation 5, we have:

$$(12)\qquad \left\{\frac{E_c}{R_1}\right\}t_2=\left\{\frac{E_3+E_a-E_c}{R_2}\right\}t_1$$

or $$(13)\qquad E_cR_2t_2=(E_3+E_a-E_c)R_1t_1$$

or $$(14)\qquad E_cR_2t_2=E_3R_1t_1+E_aR_1t_1-E_cR_1t_1$$

or $$(15)\qquad E_cR_2t_2+E_cR_1t_1=E_3R_1t_1+E_aR_1t_1$$

or $$(16)\qquad E_c(R_2t_2+R_1t_1)=(E_3+E_a)R_1t_1$$

and $$(17)\qquad E_c=\frac{(E_3+E_a)R_1t_1}{R_2t_2+R_1t_1}$$

If the value of $E_3$ is zero, then Equation 17 reduces to $$(18)\qquad E_c=\frac{E_aR_1t_1}{R_2t_2+R_1t_1}=E_aK$$

From the Equation 18 it is clear that the voltage $E_c$ is directly proportional to the pulse amplitude $E_a$ when $E_3$ is equal to zero.

Figure 5:
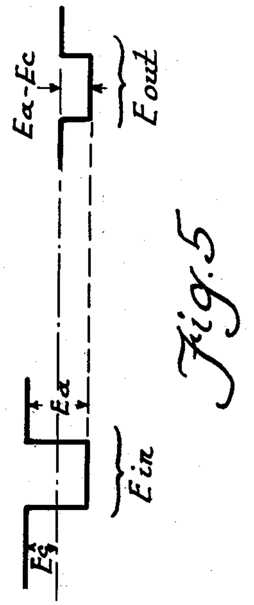
Fig. 5 is a timing diagram illustrating the relationship of the input and output voltages of the circuit of Fig. 1.

It is also apparent from the above analysis that the capacitor voltage $E_0$ can reach an equilibrium value between the values $E_1$ and $E_2$ by properly relating the resistance values of resistors $R_1$ and $R_2$ to the established time intervals $t_1$ and $t_2$. With these conditions established it can readily be shown how the circuit of Fig. 1 functions to clip the upper positive portion of the signal input wave form including any noise components or base line hash which may form a part thereof. Thus, by again referring to Fig. 1, when $E_{in}$ is positive, i. e., has the value $E_1$ the rectifier 13 conducts, but since $E_1$ is greater than the equilibrium value of $E_0$ as shown in Fig. 2, the rectifier 11 does not conduct, so that the difference between the voltages $E_1$ and $E_0$ appears across the resistor 18. At this value of $E_{in}$, the voltage at the output terminals is zero. However, when $E_{in}$ is negative, i. e., has the value $E_2$, the rectifier 11 conducts due to the voltage $E_1$ being greater than the equilibrium value of the capacitor voltage $E_0$ thus driving the anode of the rectifier 13 negative by an amount equal to the difference between the values $E_0$ and $E_2$. As a consequence, the rectifier 13 is rendered non-conductive so that the output voltage at terminal 22 assumes a finite value equal to $E_0-E_2$ in the manner shown in Fig. 2. As shown in Fig. 5, the alternating current component of the output voltage $E_0$ is equal to the voltage value $E_a$ minus the voltage value $E_c$.

The output voltage may thus be obtained in terms of $E_a$ and the time constants of the circuit by substitution in Equation 18 as follows:

$$E_{out}=E_a-\frac{E_aR_1t_1}{R_2t_2+R_1t_1}$$

or $$(19)\qquad E_{out}=E_a\left\{\frac{R_2t_2}{R_2t_2+R_1t_1}\right\}$$

Thus, it will be apparent that when the capacitor C is made to have an equilibrium voltage thereacross having a value intermediate the values $E_1$ and $E_2$, all portions of the signal input voltage $E_{in}$ having potential values in excess of the equilibrium capacitor voltage value $E_0$ are clipped and, hence, are not supplied to the output terminals 22 and 23.

With the selector switch connecting one end of the resistor 20 to ground, the voltage $E_3$ is zero in the equations developed heretofore and it will be apparent from Equation 18 above that the amplitude of the output voltage $E_c$ is determined solely by the resistance values $R_1$ and $R_2$, the time values $t_1$ and $t_2$ and the amplitude $E_a$ of the input pulses. On the other hand, and as will be apparent from Equation 17, when the voltage $E_3$ is large in comparison with the voltage $E_{in}$, that is, when the selector switch 21 connects the battery 23 to one end of the resistor 20, the clipping level $E_c$ becomes substantially independent of the amplitude of the input pulses and depends only on the value of $E_c$, the resistance values $R_1$ and $R_2$ and the time intervals $t_1$ and $t_2$. While the resistors 18 and 20 are illustrated as variable resistors to permit changing the charging and discharging intervals of the capacitor 12, it will be understood that fixed resistors of suitable value to provide the desired clipping action with a pulse wave form of fixed intervals $t_1$ and $t_2$ may be employed.

Considering the case where the resistor 20 (Fig. 1) is connected to ground, the pulse clipping circuit may be utilized to separate a desired portion of any pulse wave form from undesired portions thereof. For example, if a composite television signal comprising a video signal and synchronizing pulses which are superimposed on the video signal during the periodically recurring blanking intervals thereof, the synchronizing pulses may be separated from the picture signals by the pulse clipping circuit described heretofore.

Inasmuch as the pulse clipping circuit selects a predetermined percentage of the input pulse wave train, the circuit constants may be so chosen that the output wave train will contain only the desired synchronizing pulse portion of the composite television signal. Thus, if the values of resistors 18 and 20 and the value of capacitor 12 are chosen with relation to the intervals $t_1$ and $t_2$ of the standard television signal, a fixed percentage of the composite television wave form will appear in the output circuit of the pulse clipping circuit of Fig. 1, despite large variations in the amplitude of the received television signal.

Under present television standards, the amplitude of the synchronizing pulses is a fixed percentage of the total amplitude of the wave form, this percentage being not greater than 25% of the total amplitude of the composite television signal. In the event that the amplitude of the synchronizing pulses varies with respect to the total amplitude of the composite signal, as for example, when changing from a substantially white picture to a substantially dark picture, the resultant change in the synchronizing pulse percentage may readily be compensated for by further amplification in the subsequent stages of the receiver as will be readily apparent to those skilled in the art. In this connection it will be understood that the circuit constants of the pulse clipping circuit are so chosen that the percentage output of the pulse clipping circuit corresponds to the maximum percentage which may be passed under all situations. Thus, in the case of the reception of a television signal, the percentage would be set at approximately 25% of the total amplitude of the input signal so that with an all white picture a maximum of 25% of the input signal appears at the output terminals of the pulse clipping circuit. With a signal corresponding to an all black picture, the pulse clipping circuit will again pass 25% of the input signal, which is essentially 25% of the synchronizing pulses, the difference in amplitude of the output signals in these two situations being compensated for by subsequent amplification in later stages.

While the invention has been described in connection with a source of pulses of a given polarity with respect to ground potential, it will be understood that either positive or negative pulses may equally well be employed, the polarity of the rectifying devices 11 and 13 and potential source 23 being reversed from the polarity shown in Fig. 1 to provide equivalent clipping action with pulses of the opposite polarity.

From the foregoing, it is evident that the present invention provides a pulse clipping circuit in which noise impulses and other base line hash may be clipped from an input pulse wave train to provide a noise-free output signal consisting of an undisturbed base line broken by pulses of the same polarity as the input signal and of reduced amplitude. Also, a fixed percentage of the input signal may be selected by the pulse clipping circuit, regardless of changes in the amplitude thereof, by correctly proportioning the circuit constants relative to the time intervals of the input pulse wave train.

While there has been described what is at present considered to be the preferred emobdiment of the invention, it will be understood that various modifications may be made therein which are within the true spirit and scope of the invention as defined in the appended claims.

What is claimed as new and is desired to be secured by Letters Patent of the United States is:

1. A pulse clipping circuit, comprising a source of pulses of predetermined amplitude and having a grounded terminal and an ungrounded terminal, a first rectifying device, means connecting the cathode of said first device to the ungrounded terminal of said source, a second rectifying device, means connecting the cathode of said second device to the grounded terminal of said source, a storage element connected between the anodes of said devices, a first resistor connected across said first rectifying device, a potential source positive relative to said grounded terminal, and a second resistor connected between said potential source and the anode of said second device for maintaining said second rectifying device in a conducting state in the absence of pulses from said pulse source, whereby said storage element is charged to the peak amplitude of said pulses, and means for deriving clipped pulses from said storage element.

2. A pulse clipping circuit, comprising a source of inpust pulses having an amplitude $E_a$, a first rectifying device having the cathode thereof connected to one terminal of said source, a second rectifying device having the cathode thereof connected to the other terminal of said source, a capacitor connected between the anodes of said devices, a first resistor $R_1$ connected across said first rectifying device, a second resistor $R_2$ connected across said second rectifying device, and means for deriving an output voltage from said second resistor in accordance with the equation $$E_{\text{out}}=E_a\left\{\frac{R_2t_2}{R_2t_2+R_1t_1}\right\}$$

where $E_{out}$ is the output voltage, $t_1$ is the duration of an input pulse, and $t_2$ is the interval between input pulses.

3. A pulse clipping circuit, comprising a pulse signal source having one terminal thereof connected to a point of fixed potential and arranged to provide at the other terminal thereof a pulse wavetrain of given polarity, a storage element, first and second rectifying devices connected in series, a series circuit including said rectifying devices and said element and connected across the terminals of said pulse signal source, a first resistor connected across said first rectifying device, a second resistor connected across said second rectifying device, and means for deriving clipped pulses from said second rectifying device.

4. A pulse clipping circuit, comprising a pulse signal source having one terminal thereof connected to a point of fixed potential and arranged to provide at the other terminal thereof a pulse wavetrain of given polarity, a storage element, first and second rectifying devices connected in series, a series circuit including said rectifying devices and said element and connected across the terminals of said pulse signal source, the cathode of said second rectifying device being connected to the fixed potential terminal of said source, a first resistor connected across said first rectifying device, a second resistor connected across said second rectifying device, and means for deriving clipped pulses from said second rectifying device having an amplitude proportional to the amplitude of said pulse wavetrain.

5. A pulse clipping circuit, comprising a pulse signal source having one terminal thereof connected to a point of fixed potential and arranged to provide at the other terminal thereof a pulse wavetrain of given polarity, a storage element, first and second rectifying devices connected in series, a series circuit including said rectifying devices and said element and connected across the terminals of said pulse signal source, a first resistor connected across said first rectifying device, a source of undirectional potential positive relative to said fixed potential terminal, a second resistor connected between said potential source and said second rectifying device, and means for deriving clipped pulses from said second rectifying device.

6. A pulse clipping circuit, comprising a pulse signal source having one terminal thereof connected to a point of fixed potential and arranged to provide at the other terminal thereof a unidirectional potential which is positive relative to said fixed potential and a negative pulse wavetrain superimposed upon the unidirectional potential and of less amplitude than the unidirectional potential, a storage element, first and second rectifying devices, a series circuit including said rectifying devices and said element and connected across the terminals of said pulse signal source, the cathode of said second rectifying device being connected to the fixed potential terminal of said pulse source, a first resistor connected across said first rectifying device, and means including a second resistor connected to the anode of said second rectifying device for deriving clipped pulses therefrom.

7. A pulse clipping circuit, comprising a first circuit serially including a pulse signal source, a first resistor, a storage capacitor and a first rectifying device and arranged to charge said capacitor in one direction during excursions of the pulses from said source in one direction, a second circuit serially including said pulse source, a second rectifying device, said storage capacitor, a second resistor and a source of unidirectional potential and arranged o charge said capacitor in the opposite direction during pulse excursions in the opposite direction, and means for deriving clipped pulses from said first rectifying device.

8. A pulse clipping circuit, comprising a source of pulse of given polarity, a storage capacitor, a first resistor, a first rectifying device, means serially including said first resistor and said first rectifying device for charging said capacitor in a given direction from said pulse source during portions of said pulse signal which are positive relative to the average value thereof, a source of positive unidirectional potential, a second resistor connected between said potential source and said first rectifying device, a second rectifying device connected across said first resistor, means including said second resistor and said second rectifying device for charging said capacitor in the opposite direction from said potential source during portions of said pulse signal which are negative relative to the average value thereof, and means for deriving clipped pulses from said second resistor.

9. A pulse clipping circuit, comprising a source of input pulses of a given polarity and having an amplitude $E_a$, a storage capacitor, first and second rectifying devices, a series circuit including said first and second rectifying devices and said capacitor and connected across said source, a first resistor $R_1$ connected across said first rectifying device, and a second resistor $R_2$ connected from said second rectifying device to a positive potential $E_3$, said first and second resistors being related in accordance with the equation $$E_{out}=E_a-\frac{(E_3+E_a)R_1t_1}{R_2t_2+R_1t_1}$$

where $E_{out}$ is the voltage developed across said second rectifier, $t_1$ is the duration of an input pulse and $t_2$ is the interval between pulses.

10. A pulse clipping circuit, comprising a source of input pulses of a given polarity and having an amplitude $E_a$, said source having a grounded terminal and an ungrounded terminal, a storage capacitor, first and second rectifying devices, a series circuit including said first and second rectifying devices and said capacitor and connected across the terminals of said source, a first resistor $R_1$ connected across said first rectifying device, a source of unidirectional potential $E_3$ positive relative to the grounded terminal of said pulse source and of a magnitude greater than the pulse amplitude, and a second resistor $R_2$ connected between said potential source and said second rectifying device, said first resistor being related to said second resistor in accordance with the equation $$E_{out}=E_a-\frac{(E_3+E_a)R_1t_1}{R_2t_2+R_1t_1}$$

where $E_{out}$ is the voltage developed across said second rectifier, $t_1$ is the duration of an input pulse and $t_2$ is the interval between pulses.

11. A pulse clipping circuit, comprising a pulse signal source having one terminal thereof connected to a point of fixed potential and arranged to provide at the other terminal thereof a unidirectional potential which is positive relative to said fixed potential and a negative pulse wavetrain superimposed upon the unidirectional potential and of less amplitude than the unidirectional potential, a storage capacitor, first and second rectifying devices, a series circuit including said rectifying devices and said capacitor and connected across the terminals of said pulse source, the cathode of said second rectifying device being connected to the fixed potential terminal of said source, a first resistor $R_1$ connected across said first rectifying device, a source of unidirectional potential $E_3$ positive relative to said fixed potential, and a second resistor $R_2$ connected between said potential source and the anode of said second rectifying device, said first resistor being related to said second resistor in accordance with the equation $$E_{out}=E_a-\frac{(E_3+E_a)R_1t_1}{R_2t_2+R_1t_1}$$

where $E_{out}$ is the output pulse amplitude across said second rectifier, $t_1$ is the duration of an input pulse and $t_2$ is the interval between pulses.

12. A pulse clipping circuit, comprising a pulse signal source having one terminal thereof connected to a point of fixed potential and arranged to provide at the other terminal thereof a unidirectional potential which is positive relative to said fixed potential and a pulse wavetrain of given polarity superimposed upon the unidirectional potential and of less amplitude than the unidirectional potential, a storage capacitor, first and second rectifying devices, a series circuit including said rectifying devices and said capacitor and connected across the terminals of said pulse source, one electrode of said second rectifying device being connected to the fixed potential terminal of said source, a first resistor $R_1$ connected across said first rectifying device, a source of unidirectional potential $E_3$ positive relative to said fixed potential, and a second resistor $R_2$ connected between said potential source and the other electrode of said second rectifying device, said first resistor being related to said second resistor in accordance with the equation $$E_{out}=E_a-\frac{(E_3+E_a)R_1t_1}{R_2t_2+R_1t_1}$$

where $E_{out}$ is the output pulse amplitude across said second rectifier, $t_1$ is the duration of an input pulse and $t_2$ is the interval between pulses.

13. A pulse clipping circuit, comprising a source of pulses of a given polarity, a first series circuit including a rectifying device and a capacitor, a second rectifying device having one electrode thereof connected to one terminal of said pulse source, said series circuit and said second rectifying device being connected in series to the other terminal of said pulse source, a first resistor connected across said first rectifying device, a second resistor having one end thereof connected to the other electrode of said second rectifying device, a source of potential positive relative to the potential of said one terminal of said pulse source, and switch means for selectively connecting the other end of said second resistor either to said positive potential source or to said one terminal of said pulse source.

14. A pulse clipping circuit, comprising a source of pulses of predetermined amplitude and polarity, a first series circuit including a first rectifying device and a capacitor, a second rectifying device having the cathode thereof connected to one terminal of said pulse source, said second rectifying device and said series circuit being connected in series to the other terminal of said pulse source, a first resistor connected across said first rectifying device, a second resistor having one end thereof connected to the anode of said rectifying device, a source of unidirectional potential positive relative to the potential of said one terminal of said pulse source and of a magnitude greater than the amplitude of said pulses, and switch means for selectively connecting the other end of said second resistor either to said positive source of potential or to said one terminal of said pulse source.

15. A pulse clipping circuit, comprising a source of input pulses of a given polarity and having an amplitude $E_a$, a series circuit including a first rectifying device and a storage capacitor, a second rectifying device having one electrode thereof connected to one terminal of said pulse source, said second rectifying device and said series circuit being connected in series to the other terminal of said pulse source, a first resistor $R_1$ connected across said first rectifying device, and a second resistor $R_2$ connected across said second rectifying device, the valves of said first and second resistors being related in accordance with the following equation:

$$E_{out}=E_a\left\{\frac{R_2t_2}{R_2t_2+R_1t_1}\right\}$$

wherein $E_{out}$ is the voltage produced across the resistor $R_2$, $t_1$ is the duration of an input pulse and $t_2$ is the interval between pulses.

References Cited in the file of this patent

UNITED STATES PATENTS

| Number | Name | Date |
|---|---|---|
| 2,250,559 | Weber | July 29, 1941 |
| 2,410,983 | Koch | Nov. 12, 1946 |
| 2,418,480 | Pritchard et al. | Apr. 8, 1947 |
| 2,469,383 | Gibbs et al. | May 10, 1949 |
| 2,497,840 | Seeley | Feb. 14, 1950 |
| 2,566,832 | Grundmann | Sept. 4, 1951 |